United States Patent
Boer et al.

(10) Patent No.: US 8,894,018 B2
(45) Date of Patent: Nov. 25, 2014

(54) METHOD FOR REDUCING IN FLIGHT WAKE VORTICES AND AN AIRCRAFT WINGTIP ARRANGEMENT USED IN SUCH METHOD

(75) Inventors: Michael Frederick Boer, Lyndhurst (ZA); Anthony Charles Hoffe, Parktown North (ZA)

(73) Assignee: University of the Witwatersrand, Johannesburg (SA)

( * ) Notice: Subject to any disclaimer, the term of this patent is extended or adjusted under 35 U.S.C. 154(b) by 126 days.

(21) Appl. No.: 13/514,105

(22) PCT Filed: Dec. 10, 2010

(86) PCT No.: PCT/IB2010/055708
§ 371 (c)(1),
(2), (4) Date: Sep. 11, 2012

(87) PCT Pub. No.: WO2011/070532
PCT Pub. Date: Jun. 16, 2011

(65) Prior Publication Data
US 2013/0001367 A1    Jan. 3, 2013

(30) Foreign Application Priority Data
Dec. 10, 2009    (ZA) .................................. 2009/08787

(51) Int. Cl.
*B64C 23/06*    (2006.01)

(52) U.S. Cl.
CPC ............. *B64C 23/065* (2013.01); *Y02T 50/164* (2013.01)
USPC .................................... 244/199.4; 244/199.3

(58) Field of Classification Search
USPC ............. 244/198, 199.1, 199.2, 199.3, 199.4, 244/201, 203
See application file for complete search history.

(56) References Cited

U.S. PATENT DOCUMENTS 4,457,479 A * 7/1984 Daude ........................... 244/203
4,722,499 A * 2/1988 Klug ........................... 244/199.4
(Continued)

FOREIGN PATENT DOCUMENTS

DE          19926832 A1 * 1/2001 ................ B64C 5/08
DE     WO 2006122826 A1    11/2006
(Continued)

OTHER PUBLICATIONS

International Search Report in International Application No. PCT/IB2010/055708. International Search completed and mailed Apr. 18, 2011.

*Primary Examiner* — Benjamin P Lee
(74) *Attorney, Agent, or Firm* — Wiggin and Dana LLP; Gregory S. Rosenblatt; Jonathan D. Hall

(57) ABSTRACT

This invention discloses a method to break down, destabilize, or destroy an in flight wake vortex shed from an aircraft's wing. The wingtip has a winglet mounted to an extremity of the wing, and means for actuating displacement of the winglet relative to the wing. The winglet is displaced from a stationary position, in which the in flight wake vortex is stable, to a continuous moving condition, in which the winglet is displaced to a secondary temporary stationary position, remote from the initial stationary position, and having any angle relative to a plane extending through a vertical, longitudinal, or lateral axis of the aircraft to alter the winglet's angle of attack, and persisting in the moving condition as long as required to break down, destabilize or destroy the in flight wake vortex. The invention includes a wingtip arrangement for use in the method and an aircraft including the wingtip arrangement.

14 Claims, 7 Drawing Sheets

(56) References Cited

U.S. PATENT DOCUMENTS

| | | | |
|---|---|---|---|
| 6,345,790 B1 * | 2/2002 | Brix | 244/199.4 |
| 6,827,314 B2 * | 12/2004 | Barriety | 244/201 |
| 7,100,875 B2 * | 9/2006 | Shmilovich et al. | 244/199.4 |
| 7,150,434 B1 * | 12/2006 | Bandyopadhyay | 244/130 |
| 7,275,722 B2 * | 10/2007 | Irving et al. | 244/201 |
| 7,597,289 B2 * | 10/2009 | Shmilovich et al. | 244/199.3 |
| 7,661,629 B2 * | 2/2010 | Shmilovich et al. | 244/199.2 |
| 8,016,244 B2 * | 9/2011 | Shmilovich et al. | 244/199.3 |
| 8,376,285 B1 * | 2/2013 | Shmilovich et al. | 244/199.3 |
| 8,387,922 B2 * | 3/2013 | Breitsamter et al. | 244/199.3 |
| 2002/0066831 A1 | 6/2002 | Ngo | |
| 2004/0000619 A1 * | 1/2004 | Barriety | 244/219 |
| 2005/0133672 A1 * | 6/2005 | Irving et al. | 244/201 |
| 2005/0184196 A1 * | 8/2005 | Shmilovich et al. | 244/199 |
| 2007/0045476 A1 * | 3/2007 | Shmilovich et al. | 244/199.4 |
| 2008/0042013 A1 * | 2/2008 | Shmilovich et al. | 244/199.4 |
| 2008/0191099 A1 * | 8/2008 | Werthmann et al. | 244/199.4 |
| 2009/0173835 A1 * | 7/2009 | Shmilovich et al. | 244/199.3 |
| 2010/0006706 A1 * | 1/2010 | Breitsamter et al. | 244/199.3 |
| 2013/0092797 A1 * | 4/2013 | Wright et al. | 244/199.4 |
| 2013/0256460 A1 * | 10/2013 | Roman et al. | 244/199.4 |

FOREIGN PATENT DOCUMENTS

| | | | | |
|---|---|---|---|---|
| EP | 1493660 A1 * | 1/2005 | | B64C 3/10 |
| GB | 2282996 A | 4/1995 | | |
| WO | WO 2008031620 A2 * | 3/2008 | | B64C 23/06 |

* cited by examiner

METHOD FOR REDUCING IN FLIGHT WAKE VORTICES AND AN AIRCRAFT WINGTIP ARRANGEMENT USED IN SUCH METHOD

CROSS-REFERENCE TO RELATED APPLICATIONS

This application is the National Stage of International Application No. PCT/IB2010/055708, filed Dec. 10, 2010, the entire disclosure of which is incorporated herein by reference.

FIELD OF THE INVENTION

This invention relates to aeronautics. In particular, the invention relates to a method to break down, destabilize, or destroy an in flight wake vortex shed from an aircraft's wing and to an aircraft wingtip arrangement that can be used in such method of reducing in flight wake vortices by using same.

BACKGROUND TO THE INVENTION

Aircraft wings produce aerodynamic lift by creating a pressure distribution over the aerofoil section with a resultant force perpendicular to the flight trajectory. Because the wing is not infinitely long the pressure distributions over the upper and lower surfaces of the wing meet at the wingtip. The result is an intense rotational flow known as a lift-induced wingtip vortex. This vortex is shed from the wingtip and interacts with the airflow over the wing, known as downwash. In doing so the vortex becomes what is termed a wake vortex.

Wake vortices may linger in the air for several minutes before breaking down due to natural instabilities present in rotational flow. Aircraft flying through a wake vortex may experience loss of control or structural failure due to the severe turbulence induced by the vortex. Because the wake vortex is dangerous to other aircraft and because it takes a long time to break down naturally, long distances are required between aircraft approaching an airport, reducing the number of aircraft an airport can accommodate.

This inventions seeks to, at least in part, address these problems.

SUMMARY OF THE INVENTION

According to the invention there is provided a method to break down, destabilize, or destroy an in flight wake vortex shed from an aircraft's wing having a wingtip arrangement with at least one winglet movably mounted to an extremity of the aircraft's wing, and actuating means connected to the winglet for actuating in use displacement of the winglet relative to the aircraft's wing, the method comprising:

actuating the actuating means to displace the winglet from an initial stationary position, in which the in flight wake vortex shed from the wing is stable, to a continuous moving condition, in which the winglet is displaced to at least one secondary temporary stationary position, remote from the initial stationary position, and having any angle relative to a plane extending through a vertical, longitudinal, or lateral axis of the aircraft so as to alter the winglet's angle of attack; and persisting in the continuous moving condition as long as it is required to break down, destabilize or destroy the in flight wake vortex.

There is also provided for the moving condition to comprise oscillation or reciprocation of the winglet.

There is further provided for the moving condition to comprise rotation of the winglet about an axis parallel to the lateral, vertical, or longitudinal axis of the aircraft.

Further features of the invention provide for the moving condition to comprise linear translation of the winglet along an axis parallel to the longitudinal axis of the aircraft. Alternatively, the moving condition comprises linear translation of the winglet along an axis parallel to the longitudinal axis of the aircraft, which linear translation coincides with rotation, reciprocation, or oscillation of said winglet about an axis parallel to either the longitudinal, lateral, or vertical axis of the aircraft.

There is also provided for the actuating means to comprise a hinge arrangement operatively connected to switching means operable to regulate winglet displacement timing. Preferably, the switching means comprises at least one solenoid.

There is further provided for the hinge arrangement to comprise a first hinge that extends parallel to the vertical axis of the aircraft, the first hinge being disposed between a first base plate and a second base plate, the first base plate being connectable to the extremity of the wing while the second base plate operatively accommodates the winglet thereby allowing the winglet to in use follow a curvilinear path about the vertical axis of the aircraft.

Alternatively, there is provided for the hinge arrangement to comprise a second hinge that extends parallel to the longitudinal axis of the aircraft and substantially perpendicular to the first hinge, the second hinge being operatively connected to the second base plate and operable to accommodate the winglet thereby allowing the winglet to in use follow a curvilinear path about either the longitudinal or vertical axis of the aircraft.

Further alternatively, there is provided for the hinge arrangement comprises a third hinge disposed between a third base plate to which the winglet is connectable and the second base plate, the third hinge extending parallel to the lateral axis of the aircraft and substantially perpendicular to the second hinge, the third base plate being operable to accommodate the winglet thereby allowing the winglet to in use follow a curvilinear path about the lateral, longitudinal, or vertical axis of the aircraft.

The invention also provides for a guide means to be connected to any of the first to the third base plates to permit translational displacement of the hinge arrangement along an axis parallel to the lateral, longitudinal, or vertical axis of the aircraft. Preferably, the guide means is a rail adapted to slidably receive any of said base plates.

Finally, the invention includes a suitable power source and control circuitry for controlling displacement of the winglet. Additionally, two wingtip arrangements, located at extremities of two opposing wings, can be controlled and displaced in such a way that vortices generated from respective wings have a destructive and destabilizing effect on each other.

BRIEF DESCRIPTION OF THE DRAWINGS

Embodiments of the invention will now be described, by way of example with reference to the accompanying non-limiting drawings, wherein.

DETAILED DESCRIPTION OF THE DRAWINGS

Figure 1:
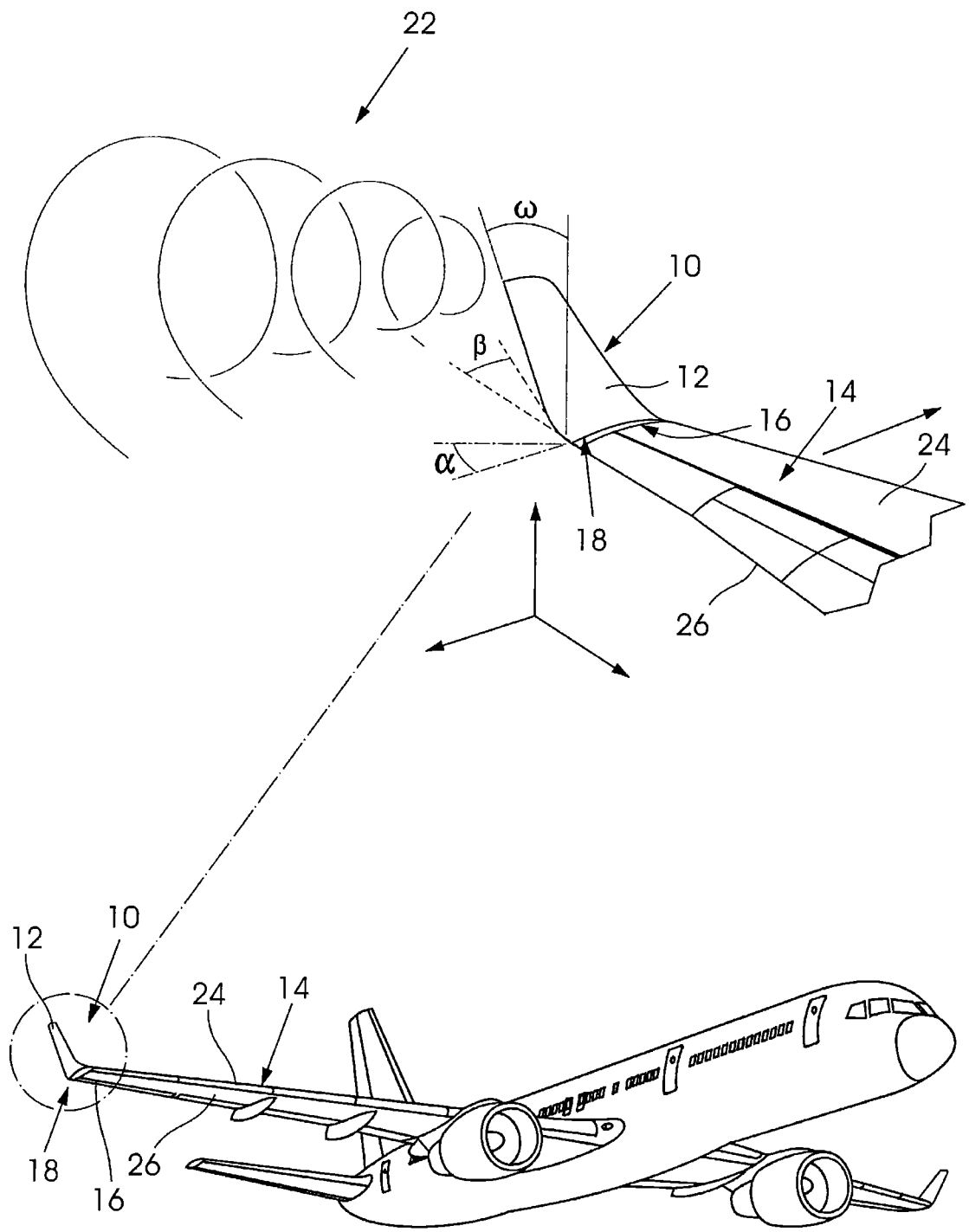
FIG. 1 shows a schematic bottom perspective view of an aircraft having a wingtip arrangement for use in a method according to an embodiment of the invention.

The description below is not intended to limit the invention in any way and is provided only to describe specific embodiments of the invention.

In the drawings, like numerals generally indicate like components, unless otherwise indicated.

Referring to FIG. 1, reference numeral 10 generally refers to a wingtip arrangement in accordance with the invention. The Wingtip arrangement 10 includes a winglet 12, movably mounted to an extremity 16 of an aircraft wing 14, and actuating means 18 connected to the winglet 12 for actuating in use displacement of the winglet 12 relative to the wing 14.

Figure 2:
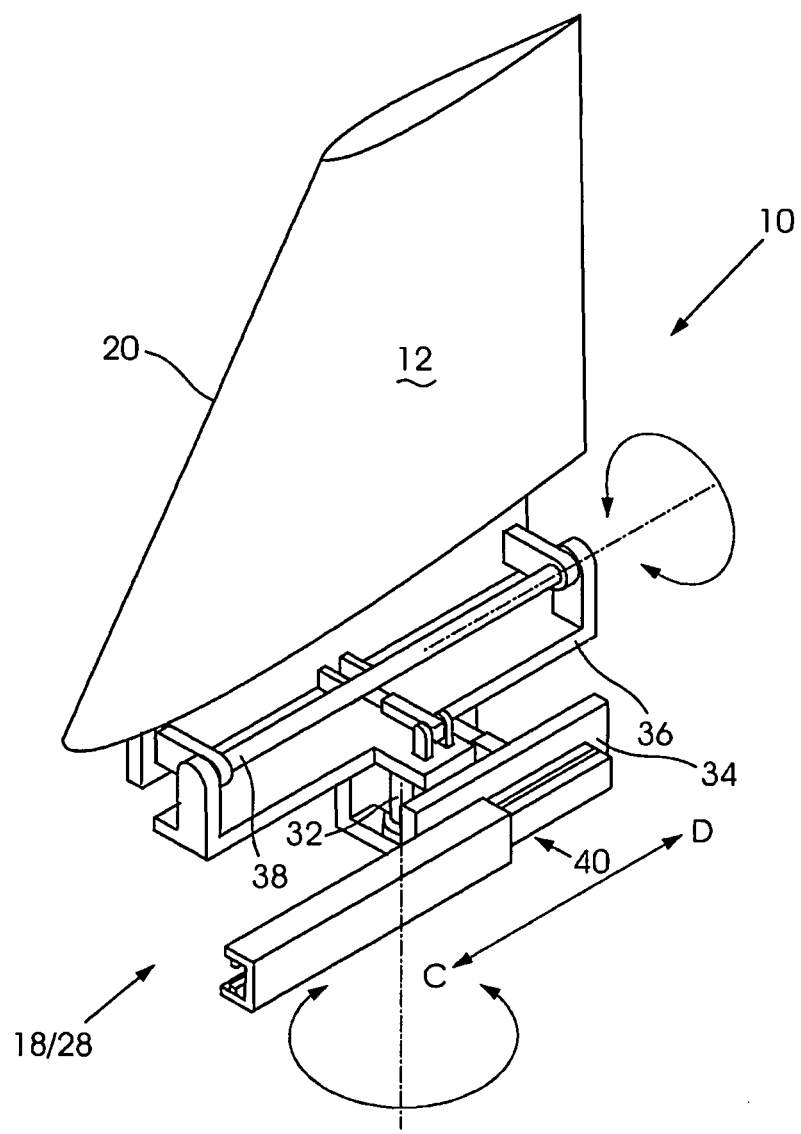
FIG. 2 shows a schematic top perspective view of the wingtip arrangement of FIG. 1.
Figure 3:
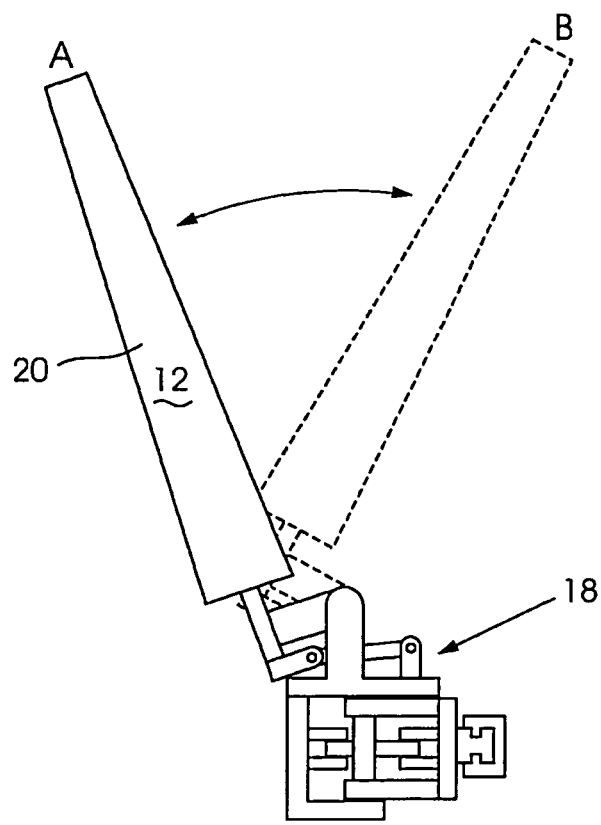
FIG. 3 shows a schematic front view of the wingtip arrangement of FIG. 1 as it is displaced between position A and position B about an axis parallel to a longitudinal axis of the aircraft.

Displacement of winglet 12, as best shown in FIGS. 2 and 3, alters the angle that a leading edge 20 of winglet 12 makes with oncoming airflow (also referred to as the angle of attack). In essence, winglet 12 is displaced from an initial stationary position A to a moving condition, as can be seen from FIG. 3.

With the winglet 12 in its initial stationary position A, an in flight wake vortex 22 flowing off, or shed from, the wing 14 is stable. The wake vortex refers to air with an intense rotational flow caused by the wing 14 not being infinitely long thereby forcing pressure distributions, which flow over upper and lower surfaces 24,26 of wing 14, to meet at extremity 16 before being shed from extremity 16 and before interacting with airflow over wing 14 (known as downwash). The result of the interaction is an intense vortex termed a wake vortex.

Figure 4:
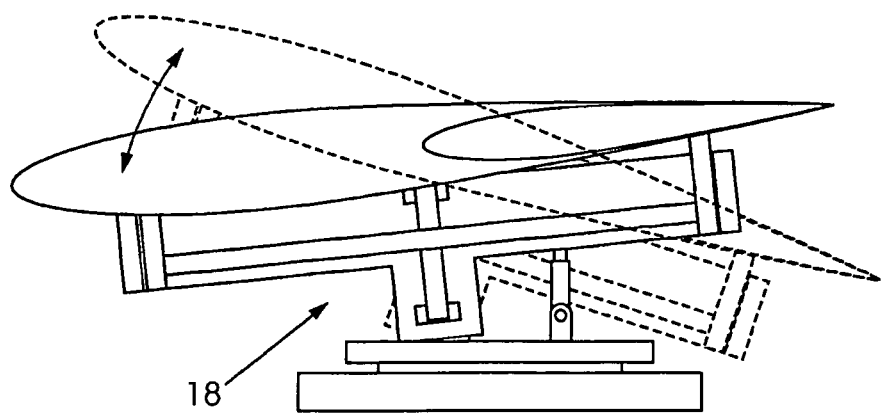
FIG. 4 shows a schematic side view of the wingtip arrangement of FIG. 1 as it is displaced about an axis parallel to a lateral axis of the aircraft.
Figure 5:
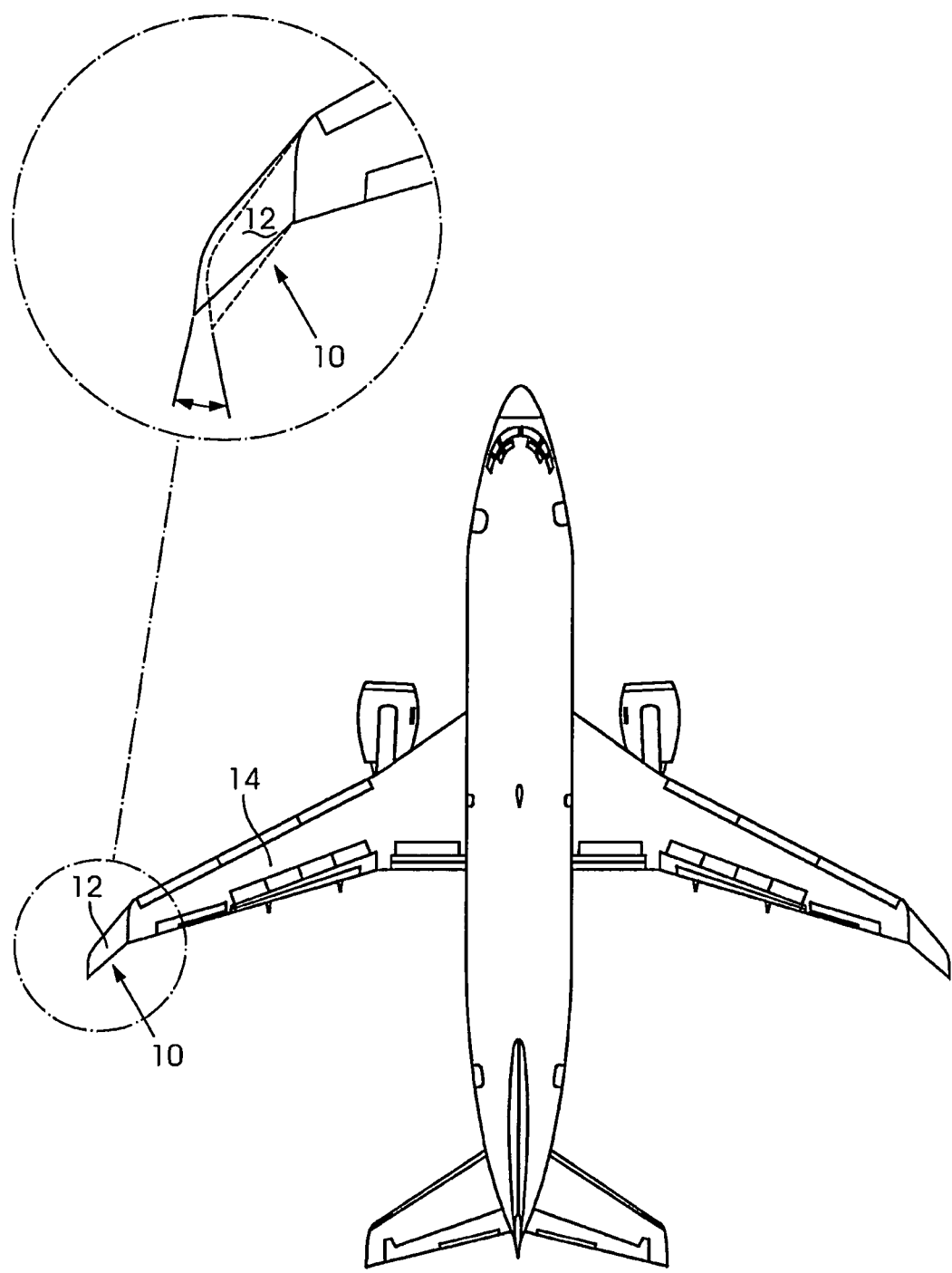
FIG. 5 shows a schematic side view of the wingtip arrangement of FIG. 1 as it is displaced about an axis parallel to a vertical axis of the aircraft.
Figure 7:
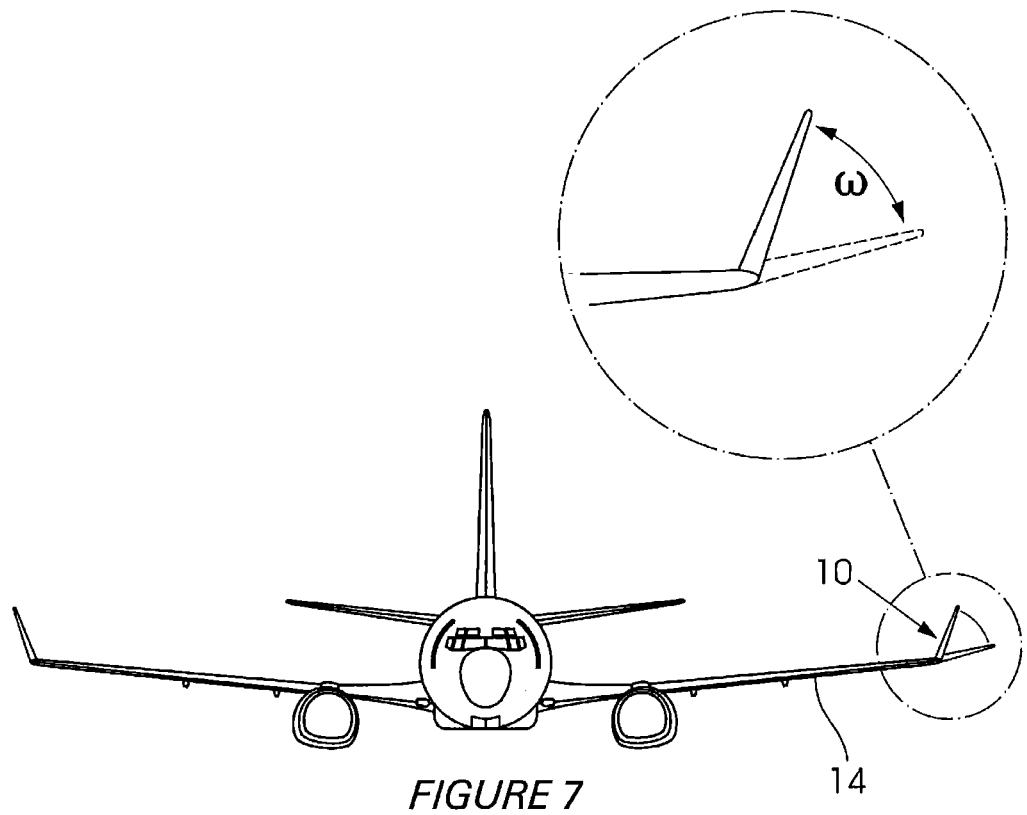
FIG. 7 shows a schematic front view of the wingtip arrangement of FIG. 1 as it is displaced about an axis parallel to a longitudinal axis of the aircraft.

The winglet 12, in its moving condition, is displaced to a selected angle to destabilize said in flight wake vortex. The angle α may be any angle relative to a plane extending through a vertical, longitudinal, or lateral axis of the aircraft. To illustrate this, the winglet 12 is shown oscillating or reciprocating between a second stationary position B and the initial stationary position A. Typically, A and B are remote from each other and winglet 12 is only temporarily either in position A or in position B. The second stationary position B allows winglet 12 to form a yaw angle a (shown in FIG. 1), rake angle β (shown in FIG. 1), and/or cant angle ω (shown in FIGS. 1 and 7) different to that of winglet 12 in the initial stationary position A. It will be appreciated that in other embodiments of the invention (not shown) the moving condition includes rotation of winglet 12 about an axis parallel to either the lateral axis of the aircraft, as shown in FIG. 4, or vertical axis of the aircraft, as shown in FIG. 5.

Figure 6:
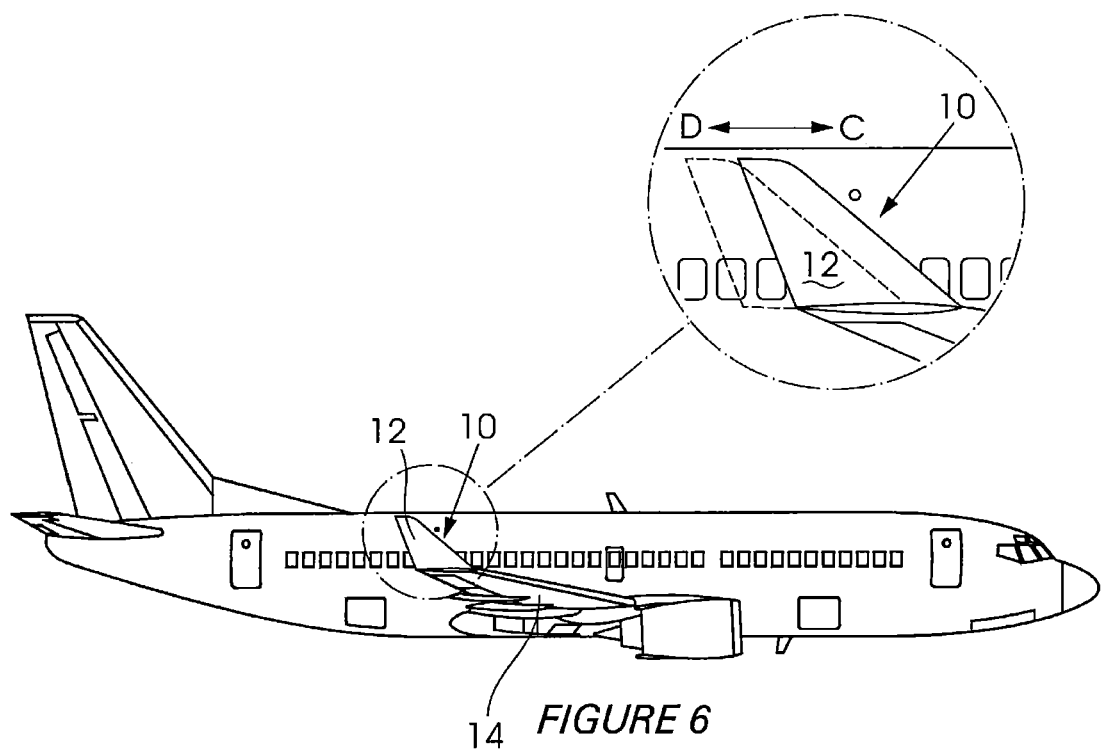
FIG. 6 shows a schematic side view of the wingtip arrangement of FIG. 1 as it is linearly displaced along an axis parallel to a longitudinal axis of the aircraft.

In another embodiment of the invention, as shown in FIGS. 2 and 6, the moving condition includes linear translation of the winglet 12 along an axis C-D running parallel to the longitudinal axis of the aircraft, thereby permitting backward and forward movement of winglet 12 along axis C-D. Although not shown in the drawings, it is also envisaged that the moving condition may include translation of the winglet 12 along a curvilinear path behind wing 14.

Alternatively, the moving condition includes linear translation of winglet 12 along axis C-D, which translation coincides with rotation, reciprocation, or oscillation of winglet 12 about an axis parallel to the longitudinal, lateral, or vertical axis of the aircraft. It is thus possible to move the winglet 12 in any direction as it moves back and forth along axis C-D. This moving condition ensures that winglet 12 oscillates sinusoidally thereby increasing airflow irregularities present in the wake vortex leading to predictable breakdown of the vortex.

Breakdown of wake vortex 22 can also occur by the interaction between two vortices generated from either wing. This can lead to destructive interference and aid in causing instabilities within the vortices. Therefore, it is envisaged that displacement of two wingtip arrangements 10 located at extremities 16 of two opposing wings may be used and controlled in such a way that vortices generated from respective wings 14, which both are equal in strength, but rotate in opposite directions, have a destructive and destabilizing effect on each other. The same results is believed to be achievable when a vortex from the aircraft's right horizontal stabilizer interacts with the wake vortex from the right wing, for example, since the vortices rotate in opposite directions and are of non-uniform strength.

The actuating means 18, as best shown in FIG. 1, includes a hinge arrangement 28 operatively connected to switching means operable to regulate winglet displacement timing. Preferably, the switching means comprises a solenoid.

The hinge arrangement 28 may also have a second hinge 38 that extends parallel to the longitudinal axis of the aircraft and substantially perpendicular to the first hinge 32 and which is connected to the second base plate 36. The second hinge 38 may also accommodate the winglet 12 and allows same to, in use, follow a curvilinear path about the longitudinal axis of the aircraft. Displacement of winglet 12 about hinge 32 and hinge 38 at the same time is thus also possible.

The hinge arrangement 28 may also have a second hinge 38 that extends parallel to the longitudinal axis of the aircraft and substantially perpendicular to the first hinge 32 and which is connected to the second base plate 36. The second hinge 38 may also accommodate the winglet 12 and allows same to, in use, follow a curvilinear path about either the longitudinal axis of the aircraft. Displacement of winglet 12 about hinge 32 and hinge 38 at the same time is thus also possible.

The hinge arrangement 28 may also have a third hinge (not shown) disposed between a third base plate (not shown), to which the winglet 12 is connected, and the second base plate 36. The third hinge then extends parallel to the lateral axis of the aircraft and substantially perpendicular to the second hinge 38. The third base plate may be adapted to accommodate winglet 12 to allow winglet 12 to, in use, follow a curvilinear path about the lateral, longitudinal, or vertical axis of the aircraft.

A guide means 40, best shown in FIG. 2, is connectable to any of the first to the third base plates and permits linear translational displacement of the hinge arrangement 28 away from extremity 18. Thus, winglet 12 is linearly movable, along an axis parallel to the lateral, longitudinal, or vertical axis of the aircraft. Preferably, the guide means is a rail 40 adapted to slidably receive any of said base plates. More preferably, said translational movement occurs only along an axis parallel to the longitudinal axis of the aircraft.

It will be appreciated that the winglet 12 will be equipped with a suitable power source and control circuitry for controlling displacement of the winglet.

Preliminary Computational Fluid Dynamics (CFD) has been done on winglet 12 oscillating about an axis parallel to the aircraft's longitudinal axis. The CFD shows that these oscillations can cause sinusoidal motion to be exhibited in the trailing vortex.

Figure 8:
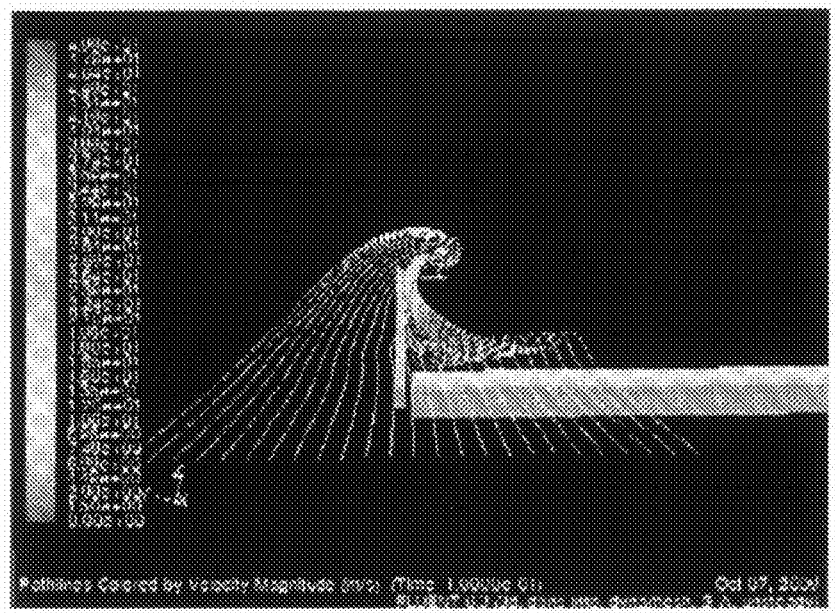
FIG. 8 shows a front view with winglet at 0° of a Computational Fluid Dynamics (CFD) diagram of the winglet of FIG. 1 as it oscillates about an axis parallel to the aircraft's longitudinal axis.
Figure 9:
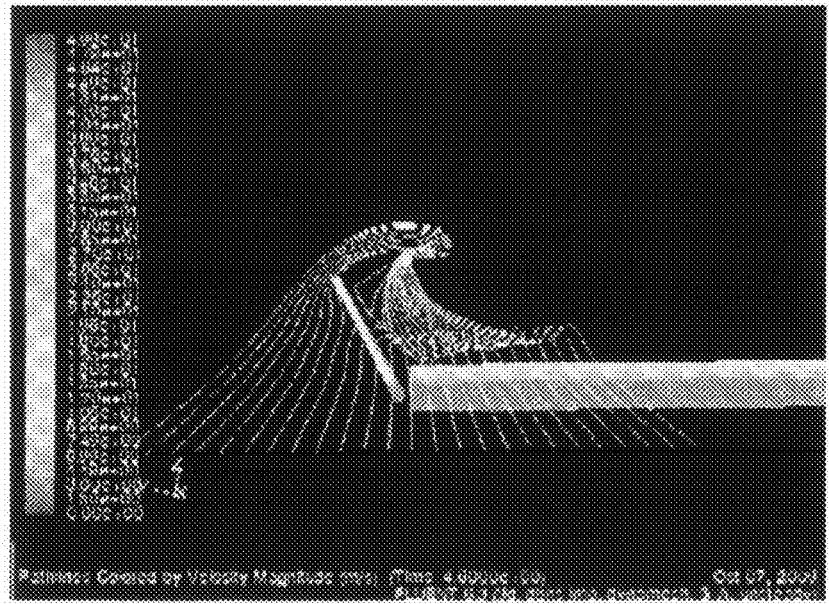
FIG. 9 shows a front view with winglet at 30° of a Computational Fluid Dynamics (CFD) diagram of the winglet of FIG. 1 as it oscillates about an axis parallel to the aircraft's longitudinal axis.
Figure 10:
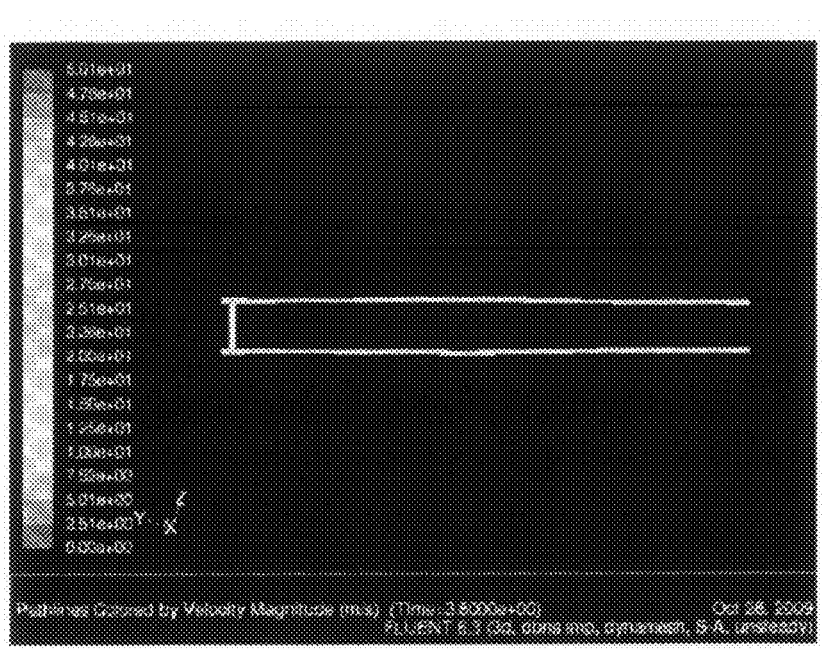
FIG. 10 shows a top view illustrating vortex formation and the start of sinusoidal motion of the wake vortex.
Figure 11:
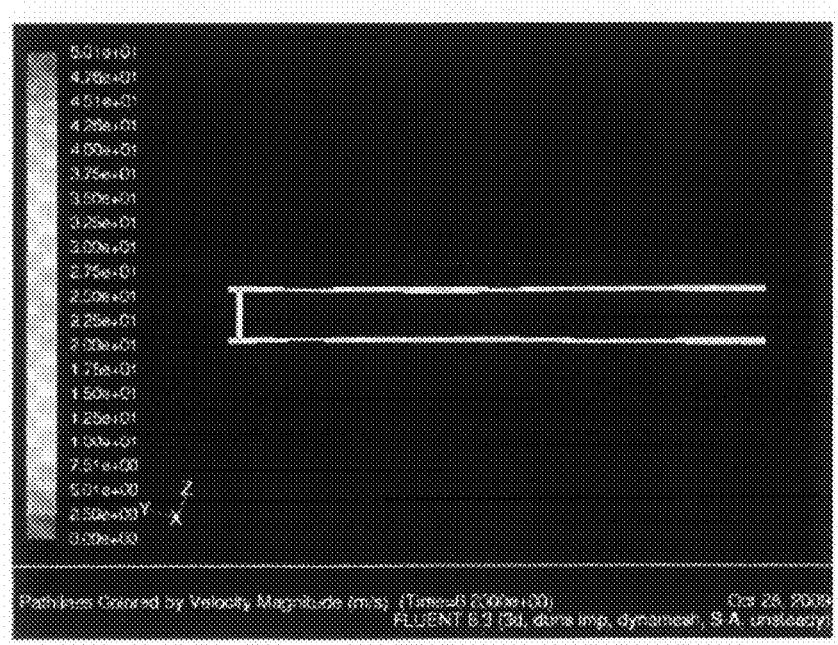
FIG. 11 shows a top view illustrating vortex formation and progression of sinusoidal motion down the vortex.

FIGS. 8 and 9 show front views of the wing 14, showing the winglet 12 moving through an angle of 30°, starting at the vertical, or neutral, position. FIGS. 10 and 11 show top views of vortex formation and motion of the wake vortex. Looking at these two figures, the sinusoidal motion can clearly be seen as the wave moves along each vortex. This was done over a distance of 10 m and so no destruction of the vortex can be seen yet, but due to the fact that the sinusoidal motion exists in the vortex core this early on, namely during the plateau phase, suggests that instability will occur sooner than normal and result in early destruction of the vortex.

A method of reducing in flight wake vortices in which the wingtip arrangement 10, as described above, is actuated and displaced to destabilize an in flight wake vortex shed from an extremity of an aircraft's wing is believed to hold great benefit since the combined motion of winglet 12 will cause wake vortices created behind the aircraft to be broken down soon after formation, resulting in the distances required between aircraft departing and approaching an airport to be reduced. This will increase the hourly number of flights operating at an airport.

While preferred embodiments of the invention are shown and described, it will be understood that it is not intended to limit the extent of the invention, but rather it is intended to cover all modifications and alternate methods, including: methods and processes for manufacturing a wingtip arrangement falling within the spirit and the scope of the invention.

The wingtip arrangement 10 and associated method of use thereof, thus, provide a neat and cost effective solution to current problems associated with wake vortex formation.

The invention claimed is:

1. A method to break down, destabilize, or destroy an in flight wake vortex shed from an aircraft's wing having a wingtip arrangement with at least one winglet movably mounted to an extremity of the aircraft's wing, guide means that extends parallel to a vertical, longitudinal or lateral axis of the aircraft, and actuating means connected to the winglet for actuating in use displacement of the winglet relative to the aircraft's wing, the method comprising:

actuating the actuating means to displace the winglet, linearly along the guide means, from an initial stationary position, in which the in flight wake vortex shed from the wing is stable, to a continuous moving condition, in which the winglet is displaced to at least one secondary temporary stationary position, remote from the initial stationary position, and having any angle relative to a plane extending through a vertical, longitudinal, or lateral axis of the aircraft so as to alter the winglet's angle of attack; and persisting in the continuous moving condition as long as it is required to break down, destabilize or destroy the in flight wake vortex.

2. The method of claim 1, including continuously oscillating or reciprocating the winglet.

3. The method of claim 1, including:
  rotating, reciprocating, or oscillating the winglet about an axis parallel to either the longitudinal, lateral, or vertical axis of the aircraft while the winglet is linearly displaced along the guide means.

4. The method of claim 3, including:
  providing a hinge arrangement having a first hinge that extends parallel to the vertical axis of the aircraft, the first hinge being disposed between a first base plate and a second base plate, the first base plate being connectable to the extremity of the wing while the second base plate operatively accommodates the winglet; and
  actuating the first hinge to effect rotation, oscillation, and/or reciprocation of the winglet about the vertical axis of the aircraft.

5. The method of claim 3, including:
  providing a hinge arrangement having
  a first hinge that extends parallel to the vertical axis of the aircraft, the first hinge being disposed between a first base plate and a second base plate, the first base plate being connectable to the extremity of the wing; and
  a second hinge that extends parallel to the longitudinal axis of the aircraft and substantially perpendicular to the first hinge, the second hinge being operatively connected to the second base plate and operable to accommodate the winglet; and
  actuating the second and/or first hinge to effect rotation, oscillation, and/or reciprocation of the winglet about either the longitudinal or vertical axis of the aircraft.

6. The method of claim 3, including:
  providing a hinge arrangement having
  a first hinge that extends parallel to the vertical axis of the aircraft, the first hinge being disposed between a first base plate and a second base plate, the first base plate being connectable to the extremity of the wing;
  a second hinge that extends parallel to the longitudinal axis of the aircraft and substantially perpendicular to the first hinge, the second hinge being operatively connected to the second base plate; and
  a third hinge disposed between a third base plate, to which the winglet is connectable, and the second base plate, the third hinge extending parallel to the lateral axis of the aircraft and substantially perpendicular to the second hinge; and
  actuating the first and/or second and/or third hinges to effect rotation, oscillation, and/or reciprocation of the winglet about either the longitudinal, vertical axis, or lateral axes of the aircraft.

7. The method of claim 6, including linearly displacing any of the first to the third base plates along guide means to permit translational displacement of the winglet along an axis parallel to the lateral, longitudinal, or vertical axis of the aircraft, which translational winglet displacement occurs either in conjunction with, or separate from, rotation, oscillation, and/or reciprocation caused by any of the first to third hinges.

8. The method of claim 7, wherein the guide means is a rail adapted to slidably receive a base plate.

9. The method of claim 1, including displacing the winglet and causing the flight wake vortex shed from the aircraft's wing to exhibit generally sinusoidal motion.

10. The method of claim 1, including:
providing actuating means in the form of a hinge arrangement including a suitable power source, control circuitry for controlling displacement of the winglet, and switching means operable to regulate displacement timing.

11. A method to break down, destabilize, or destroy an in flight wake vortex shed from an aircraft's wing, which method includes:
providing a wingtip arrangement having a winglet movably mounted to an extremity of each of the aircraft's respective wings, guide means that extends parallel to a vertical, longitudinal or lateral axis of the aircraft, and actuating means connected to said winglets for actuating in use displacement of the winglets relative to the aircraft's wing;
actuating the actuating means to displace the respective winglets, linearly along the guide means, from an initial stationary position, in which in flight wake vortices shed from the respective wings are stable, to a continuous moving condition, in which the winglets are displaced to any angle relative to a plane extending through a vertical, longitudinal, or lateral axis of the aircraft so as to alter the winglets' respective angles of attack; and
persisting in the continuous moving condition as long as it is required to break down, destabilize or destroy the in flight wake vortices of said winglets so that wake vortices generated from respective wings have a destructive and destabilizing effect on each other.

12. A wingtip arrangement for an aircraft wing comprising:
at least one winglet movably mountable to an extremity of the wing; and
actuating means in the form of a hinge arrangement connected to the winglet for actuating in use displacement of the winglet relative to the wing so as to alter the winglet's angle of attack, the hinge arrangement having
a first hinge that extends parallel to the vertical axis of the aircraft, the first hinge being disposed between a first base plate and a second base plate, the first base plate being connectable to the extremity of the wing;
a second hinge that extends parallel to the longitudinal axis of the aircraft and substantially perpendicular to the first hinge, the second hinge being operatively connected to the second base plate and operable to accommodate the winglet; and
a third hinge disposed between a third base plate, to which the winglet is connectable, and the second base plate, the third hinge extending parallel to the lateral axis of the aircraft and substantially perpendicular to the second hinge;
so that upon actuation of the first and/or second and/or third hinges, rotation, oscillation, and/or reciprocation of the winglet is affected about either the longitudinal vertical or lateral axis of the aircraft.

13. The wingtip arrangement of claim 12, wherein any of the base plates is connected to guide means, preferably in the form of a rail, to permit translational displacement of the winglet along an axis parallel to the lateral, longitudinal, or vertical axis of the aircraft, which translational winglet displacement occurs either in conjunction with, or separate from, said rotation, oscillation, and/or reciprocation caused by any of the first to third hinges.

14. An aircraft including the wingtip arrangement of claim 12.

* * * * *